United States Patent
Masunaga et al.

(10) Patent No.: US 6,866,015 B2
(45) Date of Patent: Mar. 15, 2005

(54) SEALING STRUCTURE IN DIRECT ACTING TYPE AUTO-BY STARTER

(75) Inventors: Akinobu Masunaga, Saitama (JP); Kazuhito Hotta, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/609,403

(22) Filed: Jul. 1, 2003

(65) Prior Publication Data

US 2004/0051255 A1 Mar. 18, 2004

(30) Foreign Application Priority Data

Jul. 5, 2002 (JP) .......................... 2002-197825

(51) Int. Cl.[7] .............................................. F02M 1/16
(52) U.S. Cl. ........................ 123/179.7; 251/335.3; 261/71; 277/634
(58) Field of Search .................. 123/179.7; 251/335.3; 277/634; 261/71

(56) References Cited

U.S. PATENT DOCUMENTS 2,355,713 A * 8/1944 Durdin, Jr. .................. 123/457

FOREIGN PATENT DOCUMENTS

JP 10-030501 A 2/1998

* cited by examiner

Primary Examiner—Andrew M. Dolinar
(74) Attorney, Agent, or Firm—Birch, Stewart, Kolasch & Birch, LLP

(57) ABSTRACT

To prevent the entry of ambient air and liquid such as rainwater into a direct acting type auto-by starter and thereby prevent the formation of rust in the auto-by starter, by adjusting pressure fluctuations in the auto-by starter caused by the operation of a starting valve for opening and closing a starting intake passage. A starting valve is lifted to open a starting intake passage to start an internal combustion engine. Pressure in a sliding space for the starting valve is increased, so that the gas in the sliding space flows out. The flow of the gas is absorbed by an increase in volume inside a bellows boot mounted on an upper portion of the starting valve. When the starting valve is lowered by the operation of a spring member, the pressure in the sliding space is reduced to allow the gas flow from the bellows boot into the sliding space.

21 Claims, 6 Drawing Sheets

SEALING STRUCTURE IN DIRECT ACTING TYPE AUTO-BY STARTER

CROSS-REFERENCE TO RELATED APPLICATIONS

This nonprovisional application claims priority under 35 U.S.C. § 119(a) on Patent Application No. 2002-197825, filed in Japan on Jul. 5, 2002, the entirety of which is hereby incorporated by reference.

BACKGROUND OF THE INVENTION

1. Field of the Invention

The present invention relates to a sealing structure in a direct acting type auto-by starter. In particular, the present invention relates to an improvement in a sealing structure for preventing the entry of liquid such as water into the auto-by starter due to pressure fluctuations in the auto-by starter associated with the movement of a starting valve provided in the auto-by starter.

2. Descritption of Related Art

An auto-by starter for facilitating the starting of an internal combustion engine is well known in the art as described in Japanese Patent Laid-open No. Hei 10-30501 and Japanese Utility Model Laid-open No. Sho 63-71458, for example. When starting an engine, a starting valve provided in the auto-by starter is operated to open a starting intake passage leading to the engine, thereby sucking the outside air. At the same time, fuel is supplied through a jet needle into the starting intake passage by utilizing vacuum in this passage, thereby producing a considerably concentrated air-fuel mixture, which is then supplied to a combustion chamber of the engine.

In a well-known type of auto-by starter, the starting valve is automatically operated by using wax having a temperature dependence. As another type of auto-by starter, a direct acting type auto-by starter includes a manually operated starting valve. The starting valve is operated by manipulating a lever.

FIGS. 6(a), 6(b), and 6(c) illustrate the operation of a direct acting type auto-by starter 010 in the background art. The structure of the auto-by starter 010 is schematically shown. The auto-by starter 010 has a sliding hole structure 01a formed in a carburetor body. A starting valve 02 is vertically movable in the sliding hole structure 01a by operating a manual lever (not shown). A jet needle 02g is mounted at a lower portion of the starting valve 02. When the starting valve 02 is moved upward against a spring member (not shown) by the operation of the manual lever, a starting intake passage 01c is opened by the starting valve 02 to allow induction of air through the starting intake passage 01c. At this time, fuel is supplied through the jet needle 02g into the starting intake passage 01c by vacuum in the passage 01c, thereby producing a thick air-fuel mixture, which is then introduced into a combustion chamber of the engine.

The starting valve 02 has a stem 02a slidably supported in a retainer 03. An upper portion 02b of the stem 02a projects upward from the retainer 03. With the vertical movement of the starting valve 02, the upper portion 02b of the stem 02a comes into sliding contact with a sealing portion 05a of a sealing member 05 mounted on the retainer 03.

The volume of an internal operating space in the auto-by starter 010 changes with the upward movement of the starting valve 02 by the operation of the manual lever (see FIG. 6(b)) or with the downward movement of the starting valve 02 by the operation of the spring member (see FIG. 6(a) or 6(c)), resulting in pressure fluctuations in the internal operating space. More specifically, the volume of a sliding space 02f for the starting valve 02 in the auto-by starter 010 decreases with the upward movement of the starting valve 02, causing an increase in pressure in the sliding space 02f (see FIG. 6(b)), whereas the volume of the sliding space 02f increases with the downward movement of the starting valve 02, causing a decrease in pressure in the sliding space 02f (see FIG. 6(a) or 6(c)). Such pressure fluctuations due to the changes in volume of the sliding space 02f cause a phenomenon such that gas inside the auto-by starter 010 flows out of the operating space (see FIG. 6(b)) and gas outside the auto-by starter 010 flows into the operating space (see FIG. 6(c)).

The gas flow out of the auto-by starter 010 and the gas flow into the auto-by starter 010 are made through the sealing portion 05a of the sealing member 05, which is kept in sliding contact with the upper portion 02b of the starting valve 02.

In the direct acting type auto-by starter 010 mentioned above, the flow of outside gas (ambient air) into the auto-by starter 010 or the flow of inside gas out of the auto-by starter 010 due to the pressure fluctuations in the auto-by starter 010 associated with the vertical movement of the starting valve 02 is repeatedly made. Accordingly, especially when the inside gas flows out of the auto-by starter 010, the upper end of the sealing portion 05a of the sealing member 05 is opened, or separated from the stem 02a by the discharge pressure of the inside gas, causing the production of a gap between the sealing portion 05a and the stem 02a. As a result, there is a possibility that water such as rainwater may enter the auto-by starter 010 through this gap. Furthermore, when the flow of moist ambient air into the auto-by starter 010 is repeated, liquid such as water contained in the moist ambient air may stay inside the auto-by starter 010.

The liquid staying inside the auto-by starter 010 is hard to expel to the outside of the auto-by starter 010, so that there is a possibility of formation of rust on the starting valve 02 and the inner surface of the sliding space 02f due to this liquid, causing interference with a smooth operation of the starting valve 02. Moreover, there is a possibility of freezing of this liquid in winter, causing a malfunction of the starting valve 02 operated by the manual lever. As a result, the auto-by starter for the engine cannot function sufficiently.

Thus, the gas flow through the sealing portion 05a due to the pressure fluctuations in the direct acting type auto-by starter 010 associated with the operation of the starting valve 02 as well as the entry of water such as rainwater through the sealing portion 05a into the auto-by starter 010 is a problem that cannot be ignored. It is therefore necessary to take action against the above problem. It is accordingly an object of the present invention to provide an improvement in the sealing structure 05 in the auto-by starter 010, which can solve the above problem.

SUMMARY OF THE INVENTION

The present invention relates to an improvement in the above-mentioned direct acting type auto-by starter for solving the above problem. More particularly, the present invention relates to an improvement in the sealing structure for preventing the entry of rainwater or the like into the auto-by starter due to pressure fluctuations in the auto-by starter associated with the movement of the starting valve. According to the present invention, there is provided a sealing structure in a direct acting type auto-by starter having a body, a starting valve slidably inserted in the body, operating means for operating the starting valve, and a starting intake passage adapted to be opened and closed by the starting valve. When the starting valve is operated by the operating means, the starting intake passage is opened by the starting valve to supply fuel into the starting intake passage and thereby start the internal combustion engine. The sealing structure includes volume varying means, which has the function of varying the inside volume thereof. The flow of a gas in the auto-by starter due to pressure fluctuations in the auto-by starter associated with the operation of the starting valve is absorbed by the volume varying means, whereby the flow of gas due to the pressure fluctuations is adjusted irrespective of the ambient air.

According to a first aspect of the present invention, a sealing structure in a direct acting type auto-by starter has a body, a starting valve slidably inserted in the body, operating means for operating the starting valve, and a starting intake passage adapted to be opened and closed by the starting valve. When the starting valve is operated by the operating means, the starting intake passage is opened by the starting valve to supply fuel into the starting intake passage and thereby start the internal combustion engine. The sealing structure includes volume varying means, which functions to vary the inside volume thereof. The flow of a gas in the auto-by starter due to pressure fluctuations in the auto-by starter associated with the operation of the starting valve is absorbed by the volume varying means, whereby the flow of gas due to the pressure fluctuations is adjusted irrespective of the ambient air. With this configuration, the gas in the auto-by starter is not expelled to the outside of the auto-by starter, and the ambient air is not admitted into the auto-by starter. Accordingly, the entry of liquid such as water into the auto-by starter can be substantially completely avoided to thereby prevent the formation of rust in the auto-by starter or on the starting valve due to the water staying inside the auto-by starter. Furthermore, there is no possibility of freezing of the liquid such as water staying inside the auto-by starter in winter, thereby completely eliminating malfunction of the starting valve due to freezing.

According to a second aspect of the present invention, the volume varying means includes an expansible bellows boot provided between an end portion of a stem of the starting valve and the body of the auto-by starter. Accordingly, by applying a simple structural change to the conventional auto-by starter, the following effects can be obtained in addition to the effects obtained by the first aspect of the present invention. That is, the gas flow in the auto-by starter due to the pressure fluctuations in the auto-by starter associated with the operation of the starting valve can be absorbed by an increase and decrease in volume inside the bellows boot due to the expansion and contraction of the bellows boot. Furthermore, since the bellows boot is provided between the stem of the starting valve and the body of the auto-by starter, the bellows boot is expanded and contracted by the upward and downward movements of the starting valve to thereby increase and decrease the volume inside the bellows boot, thus effecting forcible gas flow inside the auto-by starter. Accordingly, the pressure fluctuations in the auto-by starter associated with the operation of the starting valve can be suppressed, so that an increase in pressure in the auto-by starter can be suppressed to improve the sealing effect in the auto-by starter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to FIGS. 1 to 4(a), 4(b), and 4(c).

The structure of a direct acting type auto-by starter 10 according to the present invention will first be described with reference to FIGS. 1 to 3.

Figure 1:
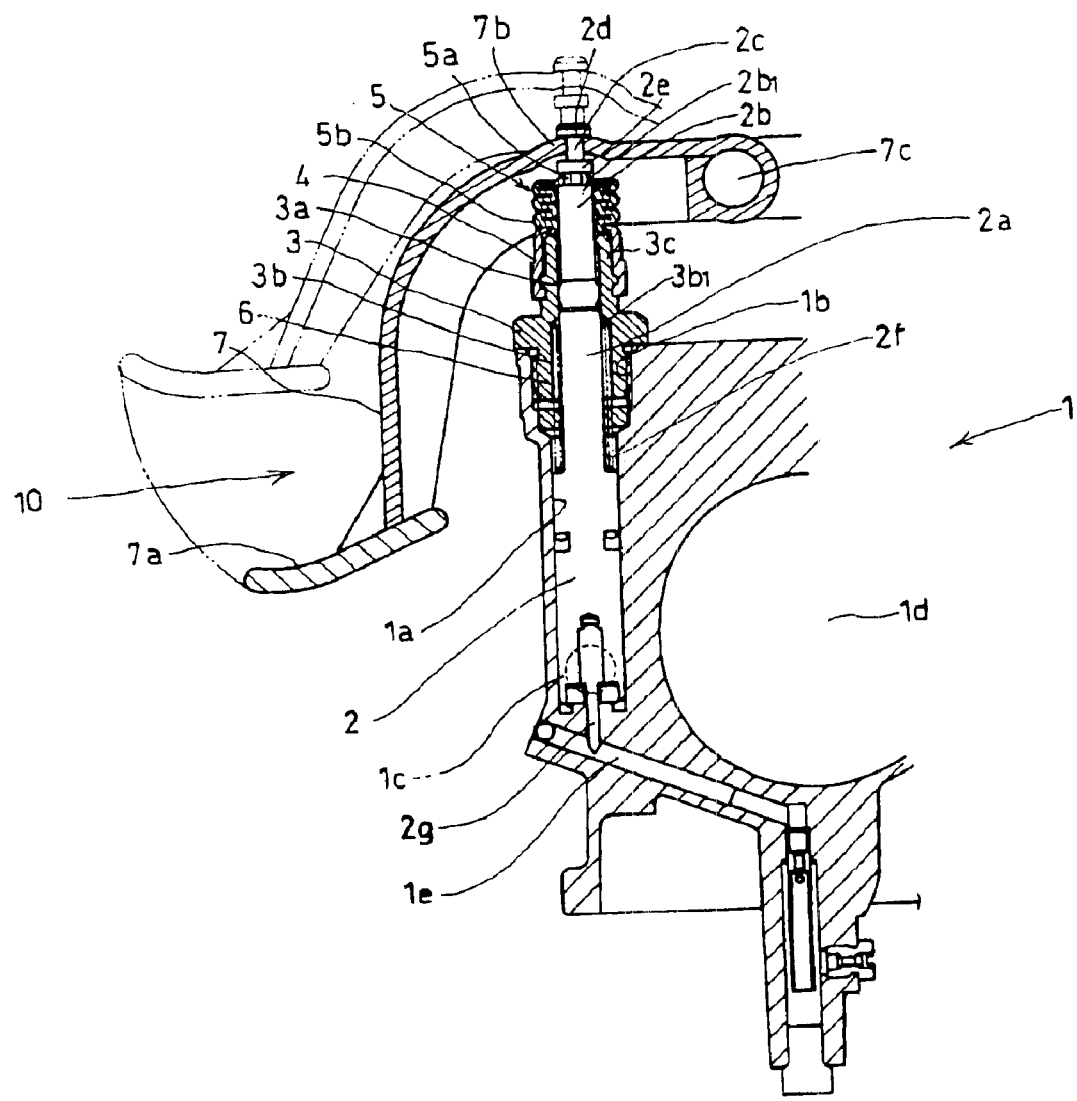
FIG. 1 is a sectional view showing a general structure of an auto-by starter according to a preferred embodiment of the present invention.
Figure 3:
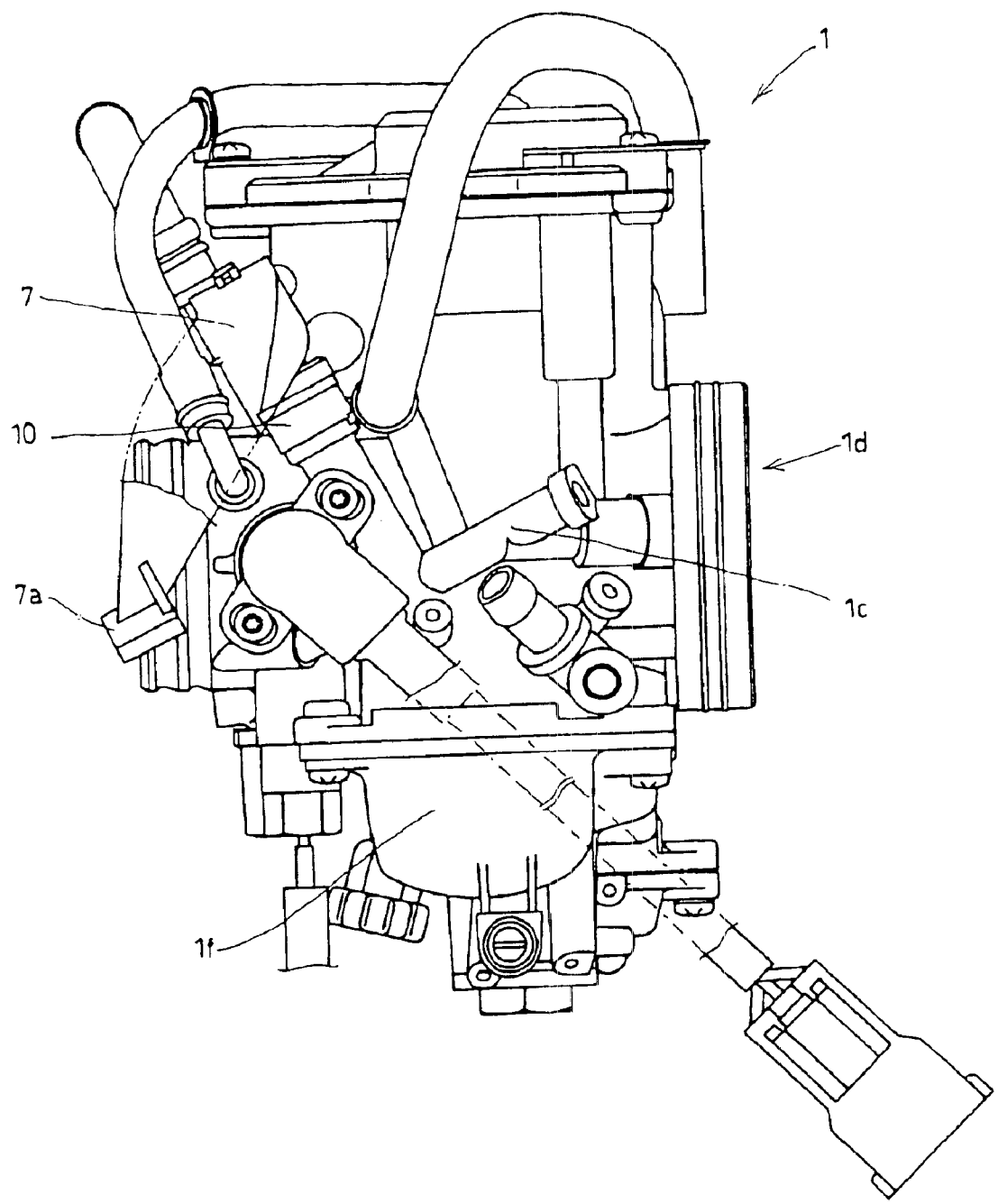
FIG. 3 is an elevational view showing a carburetor provided with the auto-by starter shown in FIG. 1.

As shown in FIGS. 1 and 3, the auto-by starter 10 is directly provided at part of a carburetor body 1. A sliding hole structure 1a constituting a primary portion of the body of the auto-by starter 10 is formed as a hole directly opened in the carburetor body 1. The sliding hole structure 1a has an opening portion 1b. A retainer 3 constituting the body of the auto-by starter 10 in combination with the sliding hole structure 1a is fixedly engaged in the opening portion 1b.

A starting valve 2 is slidably fitted in the sliding hole structure 1a. The starting valve 2 has a stem 2a slidably inserted in a sliding hole 3a axially formed through the retainer 3. An upper portion 2b of the stem 2a extends outside of the sliding hole 3a.

The retainer 3 is an important member for preventing dislocation of the starting valve 2 from the sliding hole structure 1a and ensuring a predetermined operation of the starting valve 2. The retainer 3 is further formed with a large-diameter hole 3b continuing to the sliding hole 3a through which the stem 2a of the starting valve 2 is slidably inserted. The large-diameter hole 3b is larger in diameter than the sliding hole 3a and is coaxial with the sliding hole 3a. A spring member 6 is interposed between an upper end $3b_1$ of the large-diameter hole 3b and a shoulder portion formed at the lower end of the stem 2a. Accordingly, the shoulder portion of the stem 2a is normally biased downward by the spring member 6.

Accordingly, in an inoperative condition of the auto-by starter 10, the starting valve 2 is always kept in its lower position where a starting intake passage 1c shown by a broken line in FIG. 1 is closed by the starting valve 2. FIG. 1 shows this inoperative condition of the auto-by starter 10.

The upper portion 2b of the stem 2a of the starting valve 2 projecting upward from the retainer 3 is reduced in diameter at its upper end portion to form a small-diameter portion 2c. The small-diameter portion 2c is formed with two upper and lower flanges 2d and 2e axially spaced a given distance from each other. An acting portion 7b of a manual lever 7 is supported between the upper and lower flanges 2d and 2e. The acting portion 7b is formed at a given position somewhat spaced apart from a pivot portion 7c of the manual lever 7. Thus, the manual lever 7 is operatively connected to the stem 2a of the starting valve 2.

The pivot portion 7c of the manual lever 7 is provided at a suitable position in a structural portion of the carburetor body 1, so that the manual lever 7 is pivotably supported at the pivot portion 7c to the carburetor body 1.

The manual lever 7 is formed at its outer end with an operating portion 7a, which is spaced apart from the pivot portion 7c. The operating portion 7a is manually lifted to thereby upwardly rotate the manual lever 7 about the pivot portion 7c. As a result, the starting valve 2 is lifted by the manual lever 7 at the acting portion 7b, which is engaged with the upper flange 2d of the upper portion 2b of the stem 2a. The starting valve 2 moves against the biasing force of the spring member 6, which is normally applied downward to the stem 2a, thereby opening the starting intake passage 1c, which is normally closed by the starting valve 2.

A bellows boot 5 is mounted on the upper portion 2b of the stem 2a of the starting valve 2. As shown in FIG. 2, the bellows boot 5 has an upper end 5a mounted on the small-diameter portion 2c of the upper portion 2b of the stem 2a so as to be axially sandwiched under pressure between the lower flange 2e of the small-diameter portion 2c and a shoulder portion $2b_1$ formed at the lower end of the small-diameter portion 2c. The bellows boot 5 has a lower end 5b held under pressure between an upper portion 3c of the retainer 3 and a cap member 4 for covering the upper portion 3c. Thus, the bellows boot 5 is mounted at the upper end 5a and the lower end 5b on the upper portion 2b of the stem 2a so that a hermetic seal is established.

Accordingly, the bellows boot 5 is mounted so as to substantially cover a sliding contact portion between the upper portion 2b of the stem 2a of the starting valve 2 and the upper portion 3c of the retainer 3. That is, this sliding contact portion is substantially completely shielded from the outside air by the bellows boot 5.

As mentioned above, the starting valve 2 is normally biased downward by the spring member 6 in the inoperative condition to close the starting intake passage 1c. When the manual lever 7 is manually lifted, the starting valve 2 is lifted by the manual lever 7 against the biasing force of the spring member 6 to open the starting intake passage 1c. The upward movement of the starting valve 2 is made within a sliding space 2f defined between the lower end of the retainer 3 and the shoulder portion formed at the lower end of the stem 2a.

A jet needle 2g is retained at a lower end portion of the starting valve 2 so as to project into a fuel supply passage 1e. When the starting valve 2 is lifted by the operation of the manual lever 7 against the biasing force of the spring member 6 to open the starting intake passage 1c, a suitable amount of fuel is supplied from the fuel supply passage 1e around the jet needle 2g into the starting intake passage 1c by the suction of air flowing through the intake passage 1c. Thus, the jet needle 2g functions to control the amount of fuel to be supplied into the starting intake passage 1c.

In FIG. 3, reference numerals 1d and 1f denote a main intake passage and a float chamber in the carburetor, respectively.

The operation of the above preferred embodiment of the present invention will now be described with reference to FIGS. 4(a), 4(b), and 4(c) in comparison with the background art shown in FIGS. 6(a), 6(b), and 6(c).

Figure 4C:
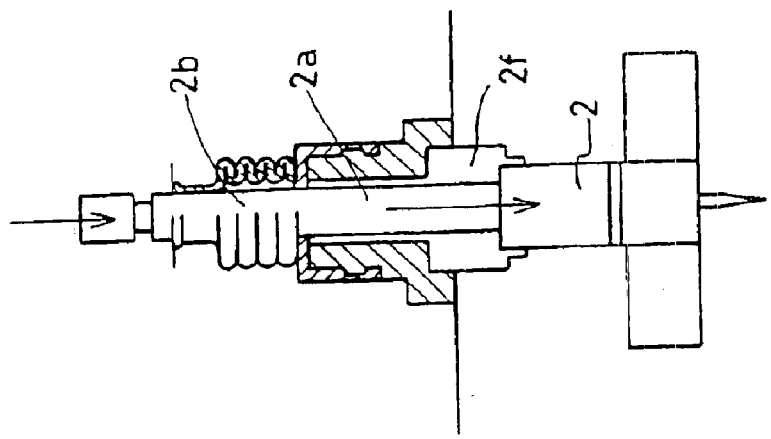
FIGS. 4(a), 4(b), and 4(c) are schematic views for illustrating the operation of the auto-by starter shown in FIG. 1.
Figure 4B:
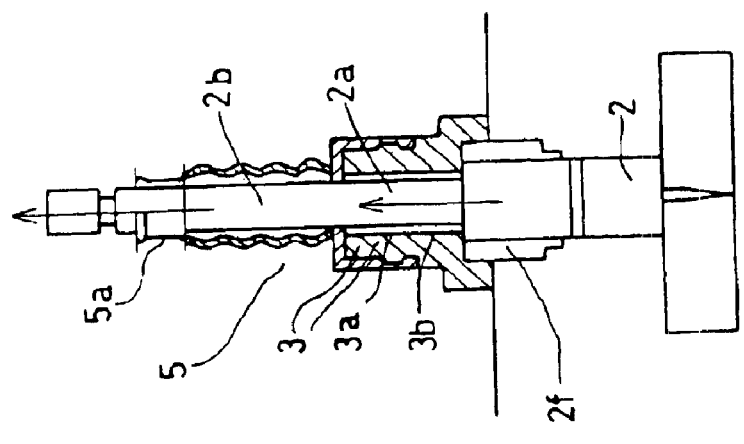
Figure 4A:
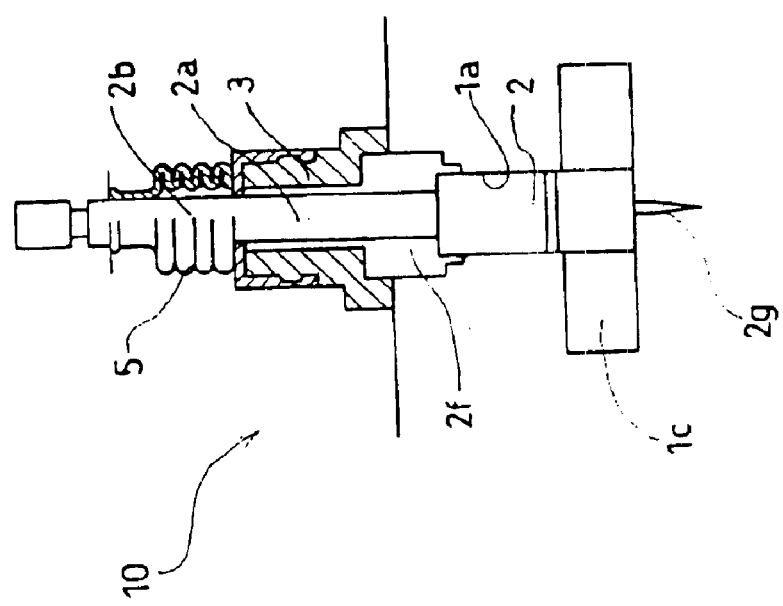

FIG. 4(a) schematically shows the inoperative condition of the auto-by starter 10. In this condition, the starting valve 2 is kept at its lower position by the biasing force of the spring member 6 (not shown in FIGS. 4(a), 4(b), and 4(c); see FIG. 1), and the starting intake passage 1c is accordingly kept closed by the starting valve 2. The sliding space 2f for the starting valve 2 is at a maximum volume in this inoperative condition by the lowering of the starting valve 2 as shown in FIG. 4(a).

When the manual lever 7 (not shown in FIGS. 4(a), 4(b), and 4(c); see FIG. 1) operatively connected to the upper end of the stem 2a of the starting valve 2 is lifted at the time of starting the internal combustion engine, the stem 2a of the starting valve 2 is lifted by the manual lever 7 against the biasing force of the spring member 6 as shown in FIG. 4(b). Accordingly, the starting valve 2 is lifted into the sliding space 2f. During this lifting of the starting valve 2, the volume of the sliding space 2f is gradually reduced, and when the starting valve 2 reaches an uppermost position where it abuts against the retainer 3, the lifting of the starting valve 2 is stopped.

FIG. 4(b) schematically shows such a condition where the starting valve 2 has reached the uppermost position.

In this condition shown in FIG. 4(b), the starting intake passage 1c is fully open. In an example, the amount of reduction in volume of the sliding space 2f in this condition is 0.245 cm$^3$.

The reduction in volume of the sliding space 2f due to the lift of the starting valve 2 causes an increase in pressure in the sliding space 2f, so that the gas in the sliding space 2f flows through the gap between the stem 2a of the starting valve 2 and the sliding hole 3a of the retainer 3 toward the upper end of the stem 2a. However, the gas flowing out of the sliding space 2f is sucked into the bellows boot 5 mounted so as to cover the upper portion 2b of the stem 2a of the starting valve 2. At this time, the bellows boot 5 is expanded by the lifting of the starting valve 2 to increase the volume, so that the suction of gas flowing out of the sliding space 2f into the bellows boot 5 is effected by the expansion of the bellows boot 5.

More specifically, the upper end 5a of the bellows boot 5 is mounted on the upper end of the upper portion 2b of the stem 2a of the starting valve 2, so that the upper end 5a of the bellows boot 5 is lifted by the lifting of the starting valve 2 to cause the expansion of the bellows boot 5 and accordingly increase the volume inside the bellows boot 5. As a result, the gas in the sliding space 2f is sucked through the gap between the step 2a of the starting valve 2 and the sliding hole 3a and the large-diameter hole 3b of the retainer 3 (the diameters of the holes 3a and 3b being schematically shown as the same diameter in FIGS. 4(a), 4(b), and 4(c) for simplicity of illustration) into the expanded bellows boot 5. Accordingly, the reduction in volume of the sliding space 2f due to the lifting of the starting valve 2 can be absorbed by the increase in volume of the bellows boot 5.

Figures 6A, 6B, 6C:
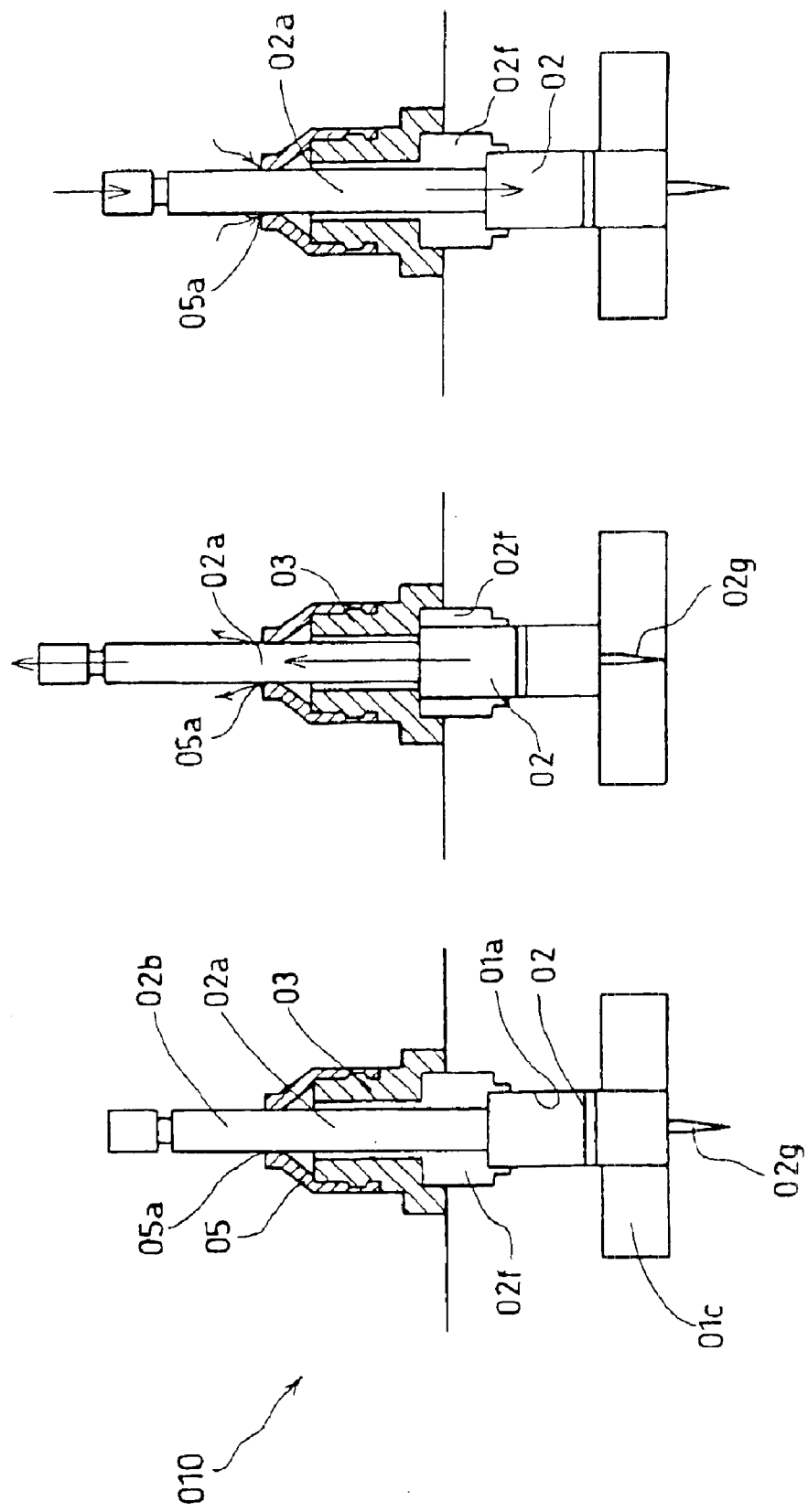
FIGS. 6(a), 6(b), and 6(c) are schematic views respectively similar to FIGS. 4(a), 4(b), and 4(c) illustrating the operation of an auto-by starter in the background art.

In the conventional sealing structure mentioned above, the gas flowing out of the sliding space 02f is discharged from the sealing portion 05a into the atmosphere (see FIG. 6(b)). Accordingly, the sealing portion 05a of the sealing member 05 is opened when the gas is discharged from the sealing portion 05a. As a result, if water such as rainwater adheres to the upper portion 02b of the starting valve 02, the water may enter the sliding space 02f from the sealing portion 05a of the sealing member 05. Such a problem can be solved by the sealing structure according to this preferred embodiment adopting the bellows boot 5.

After starting the engine, the manual lever 7 is returned to the inoperative condition. At this time, the starting valve 2 is lowered by the biasing force of the spring member 6 as shown in FIG. 4(c). Accordingly, the volume of the sliding space 2f increases with the lowering of the starting valve 2, and the pressure in the sliding space 2f temporarily decreases. At the same time, the bellows boot 5 is contracted by the lowering of the starting valve 2 to reduce the volume in the bellows boot 5 and to make the gas in the bellows boot 5 flow back into the sliding space 2f. Accordingly, the temporary decrease in pressure in the sliding space 2f is suppressed by the charging of the gas from the bellows boot 5.

More specifically, the upper end 5a of the bellows boot 5 is mounted on the upper end of the upper portion 2b of the starting valve 2. When the starting valve 2 is lowered, the bellows boot 5 is forcibly contracted by the lowering of the starting valve 2. Accordingly, the gas contained in the bellows boot 5 in its expanded condition is substantially forcibly returned into the sliding space 2f through the gap defined between the stem 2a of the starting valve 2 and the sliding hole 3a and the large-diameter hole 3b of the retainer 3. Accordingly, the pressure reduction in the sliding space 2f can be quickly suppressed to thereby avoid a substantial pressure reduction in the sliding space 2f.

In the conventional sealing structure mentioned above, the outside air is sucked into the sliding space 02f from the sealing portion 05a of the sealing member 05 by the reduction in pressure in the sliding space 02f (see FIG. 6(c)). In some cases, rainwater may also enter the sliding space 02f together with the outside air. Such a problem can be solved by the sealing structure according to this preferred embodiment adopting the bellows boot 5.

The problems in the conventional sealing structure due to the entry of liquid such as water into the auto-by starter can be substantially completely eliminated by the sealing structure according to this preferred embodiment adopting the bellows boot 5. That is, if liquid such as water enters the auto-by starter, the liquid is not expelled to the outside of the auto-by starter, but stays inside the auto-by starter, causing the formation of rust or the like inside the auto-by starter and accordingly interfering with a smooth operation of the starting valve. Furthermore, the liquid staying inside the auto-by starter may freeze in winter to cause a malfunction of the starting valve. These problems in the background art can be substantially completely eliminated by the sealing structure adopting the bellows boot 5.

With the configuration of the above preferred embodiment of the present invention shown in FIGS. 1 to 4(a), (b), and (c), the flow of gas in the auto-by starter 10 due to the upward movement of the starting valve 2 operated substantially in the sliding space 2f when operating the auto-by starter 10 or due to the downward movement of the starting valve 2 when stopping the operation of the auto-by starter 10 substantially flows between the sliding space 2f and the inside space of the bellows boot 5 covering the upper portion 2b of the starting valve 2. Furthermore, the sliding space 2f and the bellows boot 5 are related to each other so that when one of the sliding space 2f and the bellows boot 5 is contracted (decreased in volume), the other is expanded (increased in volume), whereas when one of the sliding space 2f and the bellows boot 5 is expanded (increased in volume), the other is contracted (decreased in volume). Accordingly, pressure fluctuations in the auto-by starter 10 due to the operation of the starting valve 2 can be suppressed.

As a result, an increase in pressure inside the auto-by starter 10 can be suppressed and the sealing effect in the auto-by starter 10 can therefore be improved. Furthermore, any undue force is not applied to the mounting portion of the bellows boot 5 when operating the starting valve 2, thereby preventing damage to the mounting portion and accordingly improving the durability of the bellows boot 5.

Another preferred embodiment of the present invention will now be described with reference to FIG. 5.

Figure 2:
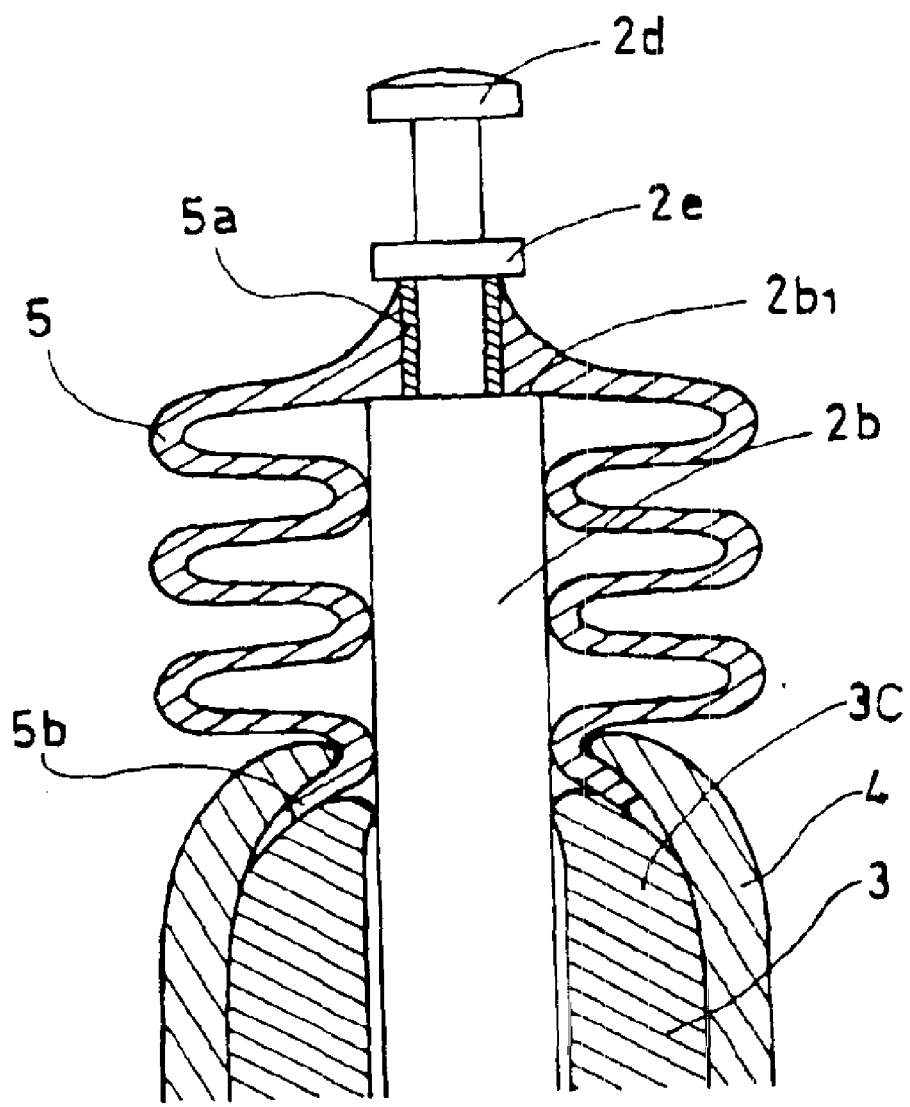
FIG. 2 is an enlarged sectional view showing an essential structure in the preferred embodiment shown in FIG. 1.
Figure 5:
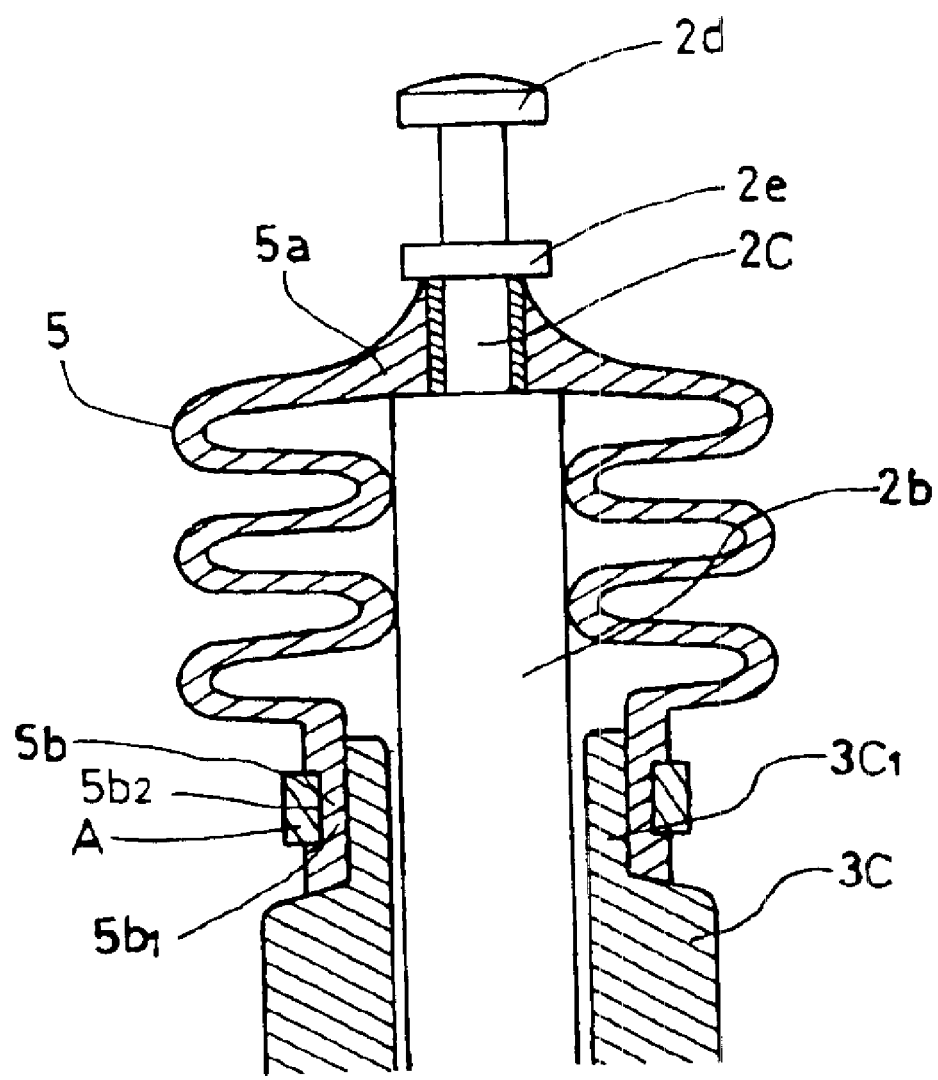
FIG. 5 is a view similar to FIG. 2, showing another preferred embodiment of the present invention.

The preferred embodiment shown in FIG. 5 is different from the preferred embodiment shown in FIG. 2 with regard to mounting means for the lower end 5b of the bellows boot 5. The upper end 5a of the bellows boot 5 is mounted similarly to that shown in FIG. 2, so the description thereof will be omitted herein. The mounting means for the lower end 5b of the bellows boot 5 includes a cylindrical extended portion $5b_1$, formed by cylindrically extending the lower end 5b, an annular recess $5b_2$ formed on the outer circumference of the cylindrical extended portion $5b_1$, fastening means A engaged with the annular recess $5b_2$, and a cylindrical boss portion $3c_1$ extending upward from the upper end of the upper portion 3c of the retainer 3.

The lower end 5b of the bellows boot 5 is mounted by first engaging the inner circumference of the cylindrical extended portion $5b_1$ of the lower end 5b of the bellows boot 5 with the outer circumference of the cylindrical boss portion $3c_1$ of the upper portion 3c of the retainer 3, and next suitably fastening these portions $5b_1$ and $3c_1$ by means of the fastening means A fitted in the annular recess $5b_2$ of the cylindrical extended portion $5b_1$.

The fastening means A may be a fastening band or a ring collar, for example.

According to this preferred embodiment shown in FIG. 5, the cap member 4 used in the preferred embodiment shown in FIG. 2 can be eliminated, so that the mounting structure of the bellows boot 5 can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sealing structure in a direct acting type auto-by starter, the direct acting type auto-by starter comprising a body; a starting valve slidably inserted in said body; operating means for operating said starting valve; and a starting intake passage adapted to be opened and closed by said starting valve, wherein when said starting valve is operated by said operating means, said starting intake passage is opened by said starting to supply fuel into said starting intake passage and thereby start an internal combustion engine, said sealing structure comprising:

volume varying means, said volume varying means functioning to vary an inside volume thereof, wherein the flow of gas in said auto-by starter due to pressure fluctuations in said auto-by starter associated with the operation of said starting valve is absorbed by said volume varying means, and wherein an upper end of said volume varying means is sealed around a small-diameter portion of a stem of the starting valve.

2. The sealing structure in a direct acting type auto-by starter according to claim 1, wherein the flow of said gas due to said pressure fluctuations is adjusted irrespective of the ambient air.

3. The sealing structure in a direct acting type auto-by starter according to claim 1, wherein said volume varying means comprises an expansible bellows boot.

4. The sealing structure in a direct acting type auto-by starter according to claim 3, wherein said bellows boot is provided between an end portion of a stem of said starting valve and said body of said auto-by starter.

5. The sealing structure in a direct acting type auto-by starter according to claim 4, wherein said body includes a retainer attached thereto, and said bellows boot is provided between said the end portion of the stem of said starting valve and said retainer.

6. The sealing structure in a direct acting type auto-by starter according to claim 5, wherein said retainer includes a cap member connected thereto, and said bellows boot is secured between said cap member and said retainer.

7. The sealing structure in a direct acting type auto-by starter according to claim 5, wherein said retainer includes a fastening means connected thereto, and said bellows boot is secured between said fastening means and said retainer, wherein the fastening means fits into an annular recess of the bellows boot.

8. A sealing structure for a direct acting type auto-by starter, the direct acting type auto-by starter comprising a body; a starting valve slidably inserted in said body; an operating lever operating said starting valve; and a starting intake passage adapted to be opened and closed by said starting valve, wherein when said starting valve is operated by said operating lever, said starting intake passage is opened by said starting value to supply fuel into said starting intake passage and thereby start an internal combustion engine, said sealing structure comprising:

a volume varying device, said volume varying device being capable of varying an inside volume therefore, wherein the flow of gas in said auto-by starter due to pressure fluctuations in said auto-by starter associated with the operation of said starting valve is absorbed by said volume varying device, and wherein an upper end of said volume varying device is axially sandwiched between a flange and a shoulder formed on an upper end of a stem of the starting valve.

9. The sealing structure for a direct acting type auto-by starter according to claim 8, wherein the flow of said gas due to said pressure fluctuations is adjusted irrespective of the ambient air.

10. The sealing structure for a direct acting type auto-by starter according to claim 8, wherein said volume varying device comprises an expansible bellow boot.

11. The sealing structure for a direct acting type auto-by starter according to claim 10, wherein said bellows boot is provided between an end portion of a stem of said starting valve and said body of said auto-by starter.

12. The sealing structure for a direct acting type auto-by starter according to claim 11, wherein said body includes a retainer attached thereto, and said bellows boot is provided between said the end portion of the stem of said starting valve and said retainer.

13. The sealing structure for a direct acting type auto-by starter according to claim 12, wherein said retainer includes a cap member connected thereto, and said bellows boot is secured between said cap member and said retainer.

14. The sealing structure for a direct acting type auto-by starter according to claim 12, further comprising a fastening means for securing a lower end of said bellows boot around an upper cylindrical surface of said retainer.

15. A sealing structure for a direct acting type auto-by starter, comprising:

a volume varying device, said volume varying device being capable of varying an inside volume thereof, a retainer secured to a body of the auto-by starter, said volume varying device being clamped around at least a portion of an outer surface of said retainer extending at least partially in an axial direction, wherein the flow of gas in said auto-by starter due to pressure fluctuations in said auto-by starter associated with the operation of a starting valve of said auto-by starter is absorbed by said volume varying device.

16. The sealing structure for a direct acting type auto-by starter according to claim 15, wherein the flow of said gas due to said pressure fluctuations is adjusted irrespective of the ambient air.

17. The sealing structure for a direct acting type auto-by starter according to claim 15, wherein said volume varying device comprises an expansible bellows boot.

18. The sealing structure for a direct acting type auto-by starter according to claim 17, wherein said bellows boot is provided between an end portion of a stem of said starting valve and said body of said auto-by starter.

19. The sealing structure for a direct acting type auto-by starter according to claim 18, wherein said bellows boot is provided between said the end portion of the stem of said starting valve and said retainer.

20. The sealing structure for a direct acting type auto-by starter according to claim 19, wherein said retainer includes a cap member connected thereto, and said bellows boot is secured between said cap member and said retainer.

21. The sealing structure for a direct acting type auto-by starter according to claim 19, further comprising fastening means for securing a lower end of said bellows boot around said outer surface of said retainer.

* * * * *